(12) United States Patent
Dumalski et al.

(10) Patent No.: US 10,300,752 B2
(45) Date of Patent: May 28, 2019

(54) ROAD/RAIL VEHICLE WITH TRACTIVE WEIGHT CONTROL

(71) Applicant: Brandt Road Rail Corporation, Regina (CA)

(72) Inventors: Josh Dumalski, Regina (CA); Dan Bonnet, Regina (CA); Greg Thomson, Emerald Park (CA); Kyle Lockert, Regins (CA)

(73) Assignee: Bandt Road Rail Corporation, Regina (CA)

( * ) Notice: Subject to any disclaimer, the term of this patent is extended or adjusted under 35 U.S.C. 154(b) by 722 days.

(21) Appl. No.: 13/804,932

(22) Filed: Mar. 14, 2013

(65) Prior Publication Data

US 2014/0261060 A1 Sep. 18, 2014

(51) Int. Cl.
*B60F 1/04* (2006.01)
*B60F 1/00* (2006.01)

(52) U.S. Cl.
CPC .............. *B60F 1/043* (2013.01); *B60F 1/005* (2013.01); *B60F 1/04* (2013.01); *B60F 2301/04* (2013.01)

(58) Field of Classification Search
CPC .. B60F 1/005; B60F 1/04; B60F 1/043; B60F 2301/04
USPC ............................................ 105/72.2, 215.2
See application file for complete search history.

(56) References Cited

U.S. PATENT DOCUMENTS

| | | | |
|---|---|---|---|
| 3,752,249 A * | 8/1973 | Gelenius et al. | 180/197 |
| 3,884,156 A * | 5/1975 | Ames et al. | 105/75 |
| 5,016,544 A | 5/1991 | Woollam | |
| 5,103,740 A | 4/1992 | Masse | |
| 5,619,931 A * | 4/1997 | Madison | 105/72.2 |
| 5,740,742 A * | 4/1998 | Bush | 105/72.2 |
| 5,868,078 A | 2/1999 | Madison | |
| 6,976,432 B2 | 12/2005 | Jacob | |
| 2002/0062181 A1* | 5/2002 | Polivka | B61L 27/0038 701/19 |
| 2005/0204949 A1* | 9/2005 | Jacob | 105/72.2 |

* cited by examiner

*Primary Examiner* — Zachary L Kuhfuss
(74) *Attorney, Agent, or Firm* — Frost Brown Todd LLC

(57) ABSTRACT

A road/rail vehicle has front and rear road wheels, an engine driving the rear road wheels, and an indicator of actual vehicle speed. Retractable front and rear rail wheels are mounted on the vehicle and movable from a raised road position for operation in a road mode to a lowered rail position where the rail wheels engage rails of a railroad track for operation in a rail mode. A suspension system is adjustable in the rail mode to vary a weight proportion of vehicle weight that is a tractive weight carried by the rear road wheels and a guidance weight carried by the rear rail wheels, and a suspension control is adjusts the suspension system to provide a selected weight proportion. A maximum allowable vehicle speed decreases as the tractive weight increases and a maximum speed indicator shows the maximum allowable vehicle speed for the selected weight proportion.

10 Claims, 2 Drawing Sheets

ROAD/RAIL VEHICLE WITH TRACTIVE WEIGHT CONTROL

FIELD

This disclosure relates to the field of vehicles for used on railway tracks and conventional roads and highways, and in particular controlling the proportion of weight between the driving wheels and the rail wheels that support the vehicle on the track rails.

BACKGROUND

It is known to adapt vehicles such as conventional highway tractors for use on rails by providing retractable rail wheels which are lowered to maintain the position of the vehicles on the railway tracks and are raised for road use of the vehicle.

For example, U.S. Pat. No. 5,103,740 to Masse discloses a vehicle for road and rail operation where both road and rail wheels are driven. An adjustable suspension can be used to vary the proportion of the vehicle weight carried by the rear rail wheels and rear road wheels when in the railway configuration. In wet conditions, in which rubber gives poor traction on steel rails, the proportion of weight carried by the rail wheels is increased such that a greater proportion of driving force and braking force are supplied through the cast iron rail wheels.

U.S. Pat. No. 5,868,078 to Madison discloses a road/rail vehicle that is street legal, but also provides sufficient power to move freight cars on low density rail lines or at other desired locations. The vehicle has a transfer case to provide front wheel drive by road wheels when the vehicle is in a road or highway mode and to provide rear wheel drive by rail wheels when in a rail mode.

U.S. Pat. No. 5,016,544 to Woollam discloses a convertible road/rail power vehicle with road wheels and retractable front, middle, and rear rail wheels for moving rail cars. Drive is provided by a set of retractable solid rubber rail wheels near the longitudinal center of gravity near the middle of the vehicle and an adjustable air bag suspension allows the amount of vehicle weight carried by the middle drive wheels to vary the tractive weight exerted on the drive wheels. The rubber rail wheels are raised for road use.

U.S. Pat. No. 6,976,432 to Jacob discloses a railcar moving vehicle with retractable rail wheels for guiding the vehicle on rails, and rubber-tired drive wheels that provide drive for both road and rail use. The rubber-tired drive wheels are configured to support the vehicle on a roadway in highway mode, and to contact the rails in rail mode such that the same road wheels drive the vehicle in both the rail and road modes. A moveable weight is disposed on a rear portion of the frame and a load-shifting mechanism moves the moveable weight between a rearward position for rail mode to provide increased tractive weight on the driving road wheels contacting the rails, and a forward position for highway mode.

Brandt Road Rail Corporation of Regina, Canada manufactures road/rail vehicle with front and rear rubber road wheels and front and rear retractable steel rail wheels where, like the Jacob vehicle described above, the rubber rear wheels provide drive for both road and rail use. In rail mode the front rail wheels are lowered and the front road wheels raised above the rails. An air bag suspension controls the proportion of vehicle weight that is carried by the rear rail wheels and the rear drive wheels. The tractive weight carried by the drive wheels provides the traction between the wheels and rails to allow the necessary propelling force to be exerted on the rails. When starting out under a heavy load the maximum tractive weight is on the rubber drive wheels with therefore reduced weight on the rear rail wheels. As the vehicle and load starts to move, the required propelling force reduces, and as the speed increases the operator manipulates a valve control connected to the air bag suspension to increase the downward force on the rear rail wheels, reducing the tractive weight on the drive wheels.

BRIEF SUMMARY

It is an object of the present methods and devices herein to provide a road/rail vehicle apparatus that overcomes problems in the prior art.

A problem with the Brandt road/rail vehicle is that the operators do not consistently adjust the tractive weight as the speed increases. In addition to causing very much increased wear on the drive tires, operating the vehicle at higher speeds with the excessive tractive weight on the driving wheels creates a significant risk of derailment. The weight of the rear of the vehicle is carried by the rear rail wheels and rear driving wheels in varying proportions, controlled by the operator. If excessive weight is on the drive wheels, then reduced weight is on the rail wheels which keep the vehicle on the rails. As the speed of the vehicle increases, lateral forces due to uneven tracks, curves, and the like increase as well and there is a danger that the rear rail wheels can slip off the tracks if sufficient down ward force is not exerted on them to maintain engagement with the rails.

In a first embodiment, the present disclosure provides a road/rail vehicle apparatus comprising a vehicle with front and rear road wheels, an engine operative to drive the rear road wheels, and an indicator of actual vehicle speed at an operator's station Retractable front and rear rail wheels are mounted on the vehicle and movable from a raised road position where the rail wheels are above a road surface for operation in a road mode, to a lowered rail position where the rail wheels engage rails of a railroad track for operation in a rail mode. A suspension system is adjustable in the rail mode to vary a weight proportion of vehicle weight that is a tractive weight carried by the rear road wheels and a guidance weight carried by the rear rail wheels, and a suspension control at the operator's station is operative to adjust the suspension system to provide a selected weight proportion. A maximum allowable vehicle speed decreases as the tractive weight increases and the guidance weight decreases, and a maximum speed indicator at the operator's station indicates the maximum allowable vehicle speed for the selected weight proportion.

In a second embodiment the present disclosure provides a method of operating a road/rail vehicle. The method comprises providing a vehicle with front and rear road wheels, an engine operative to drive the rear road wheels, and displaying actual vehicle speed at an operator's station; mounting retractable front and rear rail wheels on the vehicle such that the front and rear rail wheels are movable from a raised road mode position, where the rail wheels are above a road surface, to a lowered rail mode position; with the rail wheels in the road mode position, maneuvering the vehicle into alignment with rails of a railroad track; moving the front and rear rail wheels down to the rail mode position to engage the front and rear rail wheels with the rails; manipulating a suspension control at the operator's station to activate an adjustable suspension system to exert a downward force on the front and rear rail wheels and manipulating the suspension control to achieve a selected weight proportion of vehicle weight that is a tractive weight carried by the rear road wheels and a guidance weight carried by the rear rail wheels; displaying a maximum allowable vehicle speed for the selected weight proportion wherein the maximum allowable vehicle speed decreases as the tractive weight increases and as the guidance weight decreases; and operating the vehicle at an actual vehicle speed no greater than the maximum allowable vehicle speed.

The present disclosure reduces the risk of derailment due to insufficient guidance weight on the rear rail wheels, particularly at higher speeds where injury and damage from derailment can be severe.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION

Figure 1:
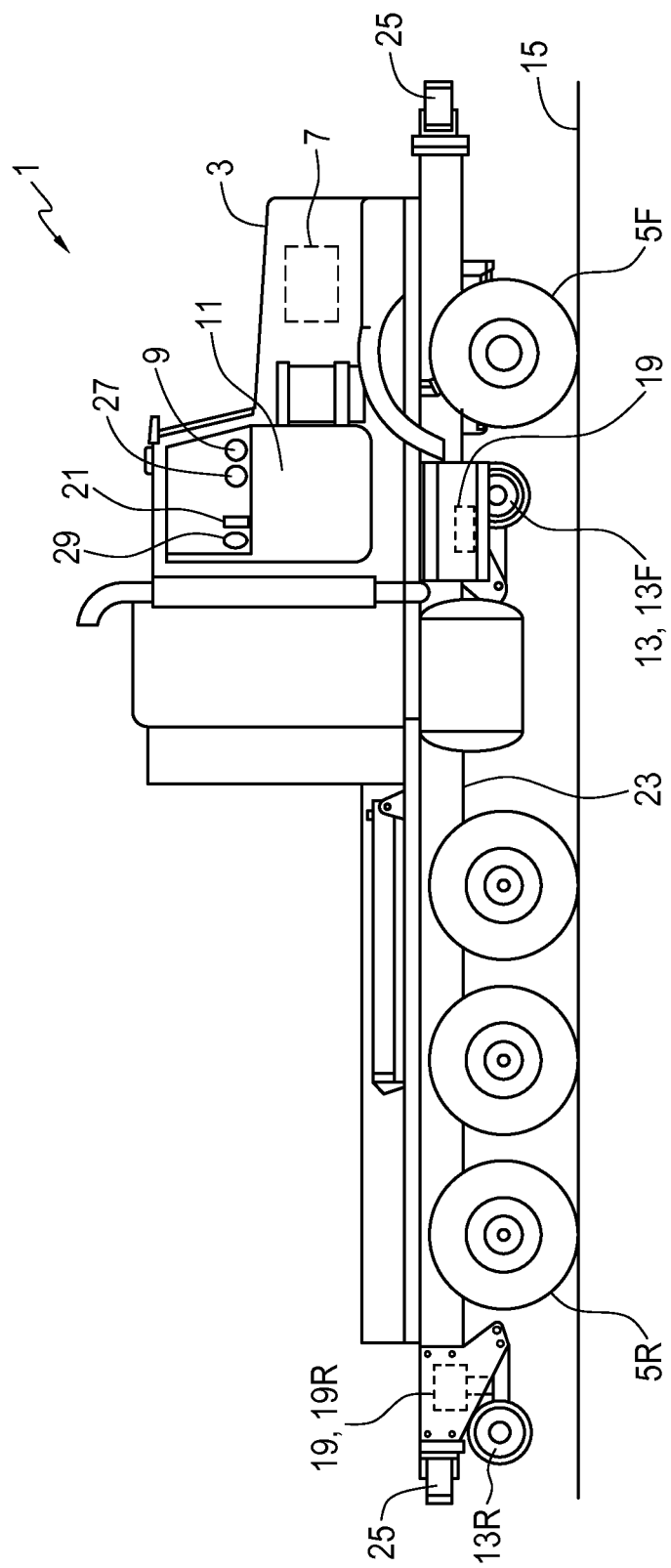
FIG. 1 is a side view of an embodiment of a road/rail vehicle apparatus of the present disclosure in a road mode.
Figure 2:
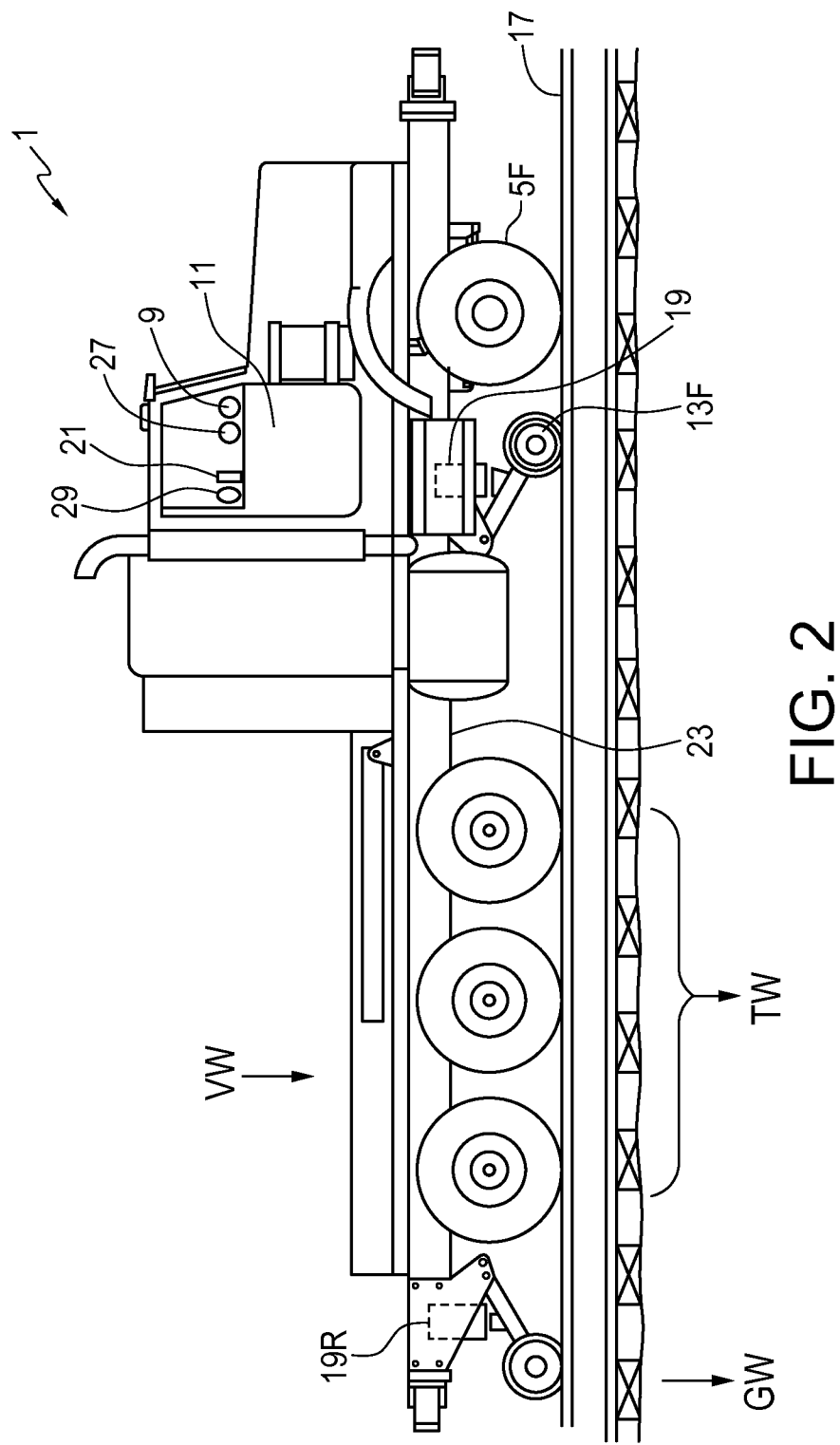
FIG. 2 is a side view of the embodiment of FIG. 1 in a rail mode.

FIGS. 1 and 2 illustrate an embodiment of a road/rail vehicle apparatus 1 of the present disclosure. The apparatus 1 comprises a vehicle 3 with front and rear road wheels 5F, 5R an engine 7 operative to drive the rear road wheels 5R, and an indicator 9 displaying the actual vehicle speed to an operator at an operator's station 11. In the illustrated apparatus 1 there are three sets of rear wheels 5R, and typically all the rear wheels 5R will be driving wheels to take advantage of the available weight of the vehicle 3 to act as tractive weight to provide as much traction as possible.

Retractable front and rear rail wheels 13F, 13R are mounted on the vehicle 1 and are movable from a raised road position where the rail wheels are above a road surface 15 for operation in a road mode as illustrated in FIG. 1, to a lowered rail position where the rail wheels engage rails 17 of a railroad track for operation in a rail mode as illustrated in FIG. 2. The rail wheels 13 are not driven.

A suspension system, schematically illustrated in the apparatus 1 as a plurality of air bags 19, is operative to exert a downward force on the rail wheels 13. The suspension system is adjustable in the rail mode to vary a weight proportion of vehicle weight VW that is a tractive weight TW carried by the three rear road wheels 5R and a guidance weight GW carried by the rear rail wheels 13R. A portion of the vehicle weight VW is of course also carried by the front rail wheels 13F, with typically little if any weight on the front road wheels, and this weight does not change significantly as the weight proportion changes. A suspension control 21 at the operator's station 11 is operative to adjust the suspension system to provide a selected weight proportion.

For illustration purposes air bags 19 are schematically illustrated as exerting forces on the front and rear rail wheels 13F, 13R, however typically the vehicle frame 23 is suspended on the road wheels 5 with air bags as well, and air pressure in all the air bags is increased or decreased to achieve the desired selected weight proportion, as is known in the art. In the illustrated apparatus 1 increasing the pressure in the rear air bag 19R will shift the weight proportion by increasing the guidance weight GW carried by the rear rail wheels 13R and decreasing the tractive weight TW carried by the driving rear road wheels 5R.

For safety the suspension control 21 is typically operative to adjust the suspension system to provide a guidance weight GW only in a range between a minimum guidance weight, determined to provide sufficient guidance weight to ensure the apparatus 1 stays on the rails and a maximum guidance weight, which will provide a corresponding tractive weight TW that is still sufficient to drive the apparatus along the rails 17. Because the adjustment is proportional between the guidance and tractive weights, corresponding maximum and minimum tractive weights TW will be provided as well.

The apparatus 1 has rail car hitches 25 at front and rear ends thereof and is used for moving rail cars connected to a hitch 25. For start-up under load it will generally be desired to have as much traction as possible, at least where a heavy load is being moved. The operator will thus typically manipulate the suspension control to adjust the air bags 19 to provide the minimum guidance weight and maximum tractive weight. As the apparatus 1 starts to move and pick up speed, lateral forces due to uneven rails, curves, and the like will increase as the speed increases. In order to reduce the risk of derailment, the guidance weight GW must be increased as the speed increases to provide sufficient downward guidance force to ensure engagement of the rear rail wheels 13R with the rails 17.

Put another way, the maximum allowable vehicle speed decreases as the tractive weight increases and the guidance weight decreases, and for a given apparatus 1 a maximum speed can be determined for any particular weight ratio and displayed on a maximum speed indicator 27 at the operator's station 11. The operator can then compare the actual speed indicated on the speed indicator 9 and compare same with the maximum allowable vehicle speed for the weight proportion that is selected at that time, and adjust accordingly.

To avoid operator error, the apparatus 1 can also include a speed limiting control 29 operative to prevent the vehicle speed from exceeding the maximum allowable vehicle speed. Alternatively to achieve a similar result, the suspension control 21 can also be operative to receive speed signals indicating the actual vehicle speed and adjust the air bags 19 to provide a weight proportion where the corresponding maximum allowable vehicle speed is at least equal to the actual vehicle speed.

The present disclosure also provides a method of operating a road/rail vehicle comprising providing a vehicle 3 with front and rear road wheels 5, an engine 7 operative to drive the rear road wheels 5R, and displaying actual vehicle speed on the indicator 9 at the operator's station 11, and mounting retractable front and rear rail wheels 13 on the vehicle such that the front and rear rail wheels are movable from a raised road mode position as illustrated in FIG. 1, where the rail wheels 13 are above the road surface 15 to a lowered rail mode position as illustrated in FIG. 2; with the rail wheels 13 in the road mode position, maneuvering the vehicle 3 into alignment with rails 17 of a railroad track; moving the front and rear rail wheels 13 down to the rail mode position to engage the front and rear rail wheels 13 with the rails 17; manipulating the suspension control 21 at the operator's station 11 to activate an adjustable suspension system, provided in the illustrated apparatus by air bags 19, to exert a downward force on the front and rear rail wheels 13 and manipulating the suspension control 21 to achieve a selected weight proportion of vehicle weight VW that is a tractive weight TW carried by the rear road wheels 5R and a guidance weight GW carried by the rear rail wheels 13R;

displaying a maximum allowable vehicle speed for the selected weight proportion wherein the maximum allowable vehicle speed decreases as the tractive weight increases and as the guidance weight decreases; and operating the vehicle 3 at an actual vehicle speed no greater than the maximum allowable vehicle speed.

The method may be automated by automatically limiting the vehicle speed to the maximum for the selected weight proportion, or by automatically adjusting the weight proportion to provide a maximum speed at least as high as the actual vehicle speed.

The present disclosure thus provides increased safety as the risk of derailment due to insufficient guidance weight GW is reduced.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A road/rail vehicle apparatus comprising:
a vehicle with front and rear road wheels, an engine operative to drive the rear road wheels, and an indicator of actual vehicle speed at an operator's station;
retractable front and rear rail wheels mounted on the vehicle and movable from a raised road position where the rail wheels are above a road surface for operation in a road mode, to a lowered rail position where the rail wheels engage rails of a railroad track for operation in a rail mode;
a suspension system adjustable in the rail mode to vary a weight proportion of vehicle weight that is a tractive weight carried by the rear road wheels and a guidance weight carried by the rear rail wheels;
a suspension control at the operator's station operative to adjust the suspension system to provide a selected weight proportion;
wherein a maximum allowable vehicle speed decreases as the tractive weight increases and the guidance weight decreases, and for the selected weight proportion the maximum allowable speed is selected to ensure that the guidance weight provides sufficient downward guidance force to ensure engagement of the rear rail wheels with rails of a railroad track, and wherein a maximum speed indicator at the operator's station indicates the maximum allowable vehicle speed for the selected weight proportion.

2. The apparatus of claim 1 wherein the suspension system comprises a plurality of air bags operative to exert a downward force on at least the rear rail wheels.

3. The apparatus of claim 1 wherein the suspension control is operative to adjust the suspension system to provide a guidance weight in a range between a minimum guidance weight and a maximum guidance weight.

4. The apparatus of claim 1 comprising a speed limiting control operative to prevent the vehicle speed from exceeding the maximum allowable vehicle speed.

5. The apparatus of claim 1 wherein the suspension control is operative to receive speed signals indicating an actual vehicle speed and adjust the suspension system to provide a weight proportion where the corresponding maximum allowable vehicle speed is at least equal to the actual vehicle speed.

6. A method of operating a road/rail vehicle to ensure engagement of rear rail wheels thereof with rails of a railroad track, the method comprising:
providing a vehicle with front and rear road wheels, an engine operative to drive the rear road wheels, and displaying actual vehicle speed at an operator's station;
mounting retractable front and rear rail wheels on the vehicle such that the front and rear rail wheels are movable from a raised road mode position, where the rail wheels are above a road surface, to a lowered rail mode position;
with the rail wheels in the road mode position, maneuvering the vehicle into alignment with rails of a railroad track;
moving the front and rear rail wheels down to the rail mode position to engage the front and rear rail wheels with the rails;
manipulating a suspension control at the operator's station to activate an adjustable suspension system to exert a downward force on the front and rear rail wheels and manipulating the suspension control to achieve a selected weight proportion of vehicle weight that is a tractive weight carried by the rear road wheels and a guidance weight carried by the rear rail wheels;
determining a maximum allowable vehicle speed for the selected weight proportion so that the guidance weight provides sufficient downward guidance force to ensure engagement of the rear rail wheels;
displaying the maximum allowable vehicle speed; and
operating the vehicle at an actual vehicle speed no greater than the maximum allowable vehicle speed.

7. The method of claim 6 wherein the suspension system comprises a plurality of air bags operative to exert a downward force on the rail wheels.

8. The method of claim 6 wherein the suspension control is operative to adjust the suspension system to provide a guidance weight in a range between a minimum guidance weight and a maximum guidance weight.

9. The method of claim 6 comprising providing a speed limiting control operative to prevent the vehicle speed from exceeding the maximum allowable vehicle speed.

10. The method of claim 6 wherein the suspension control is operative to receive speed signals indicating an actual vehicle speed and adjust the suspension system to provide a weight proportion where the corresponding maximum allowable vehicle speed is at least equal to the actual vehicle speed.

* * * * *

UNITED STATES PATENT AND TRADEMARK OFFICE
CERTIFICATE OF CORRECTION

PATENT NO. : 10,300,752 B2  
APPLICATION NO. : 13/804932  
DATED : May 28, 2019  
INVENTOR(S) : Josh Dumalski et al.

Page 1 of 1

It is certified that error appears in the above-identified patent and that said Letters Patent is hereby corrected as shown below:

On the Title Page

(73) Assignee: reads "Bandt Road Rail Corporation, Regina (CA)"; which should be deleted and replaced with "Brandt Road Rail Corporation, Regina (CA)"

Signed and Sealed this  
Thirtieth Day of July, 2019

Andrei Iancu  
*Director of the United States Patent and Trademark Office*